US012741571B2

(12) United States Patent
Wittl

(10) Patent No.: US 12,741,571 B2
(45) Date of Patent: Sep. 22, 2026

(54) VEHICLE SEAT

(71) Applicant: GRAMMER Aktiengesellschaft, Ursensollen (DE)

(72) Inventor: Sebastian Wittl, Amberg (DE)

(73) Assignee: GRAMMER Aktiengesellschaft, Ursensollen (DE)

( * ) Notice: Subject to any disclaimer, the term of this patent is extended or adjusted under 35 U.S.C. 154(b) by 181 days.

(21) Appl. No.: 18/651,834

(22) Filed: May 1, 2024

(65) Prior Publication Data

US 2024/0383380 A1 Nov. 21, 2024

(30) Foreign Application Priority Data

May 17, 2023 (DE) ..................... 10 2023 113 094.3

(51) Int. Cl.
*B60N 2/14* (2006.01)
*B60N 2/07* (2006.01)

(52) U.S. Cl.
CPC ........... *B60N 2/146* (2013.01); *B60N 2/0727* (2013.01)

(58) Field of Classification Search
CPC ........ B60N 2/146; B60N 2/0727; B60N 2/06; B60N 2/14; B60N 2002/0055
See application file for complete search history.

(56) References Cited

U.S. PATENT DOCUMENTS

2013/0127221 A1* 5/2013 Seibold .................... B60N 2/08 297/344.24
2015/0035334 A1* 2/2015 Roth ........................ B60N 2/06 297/344.24
2017/0210251 A1* 7/2017 Murray .................... B60N 2/24
2019/0143849 A1* 5/2019 Murakami ........... B60N 2/0705 297/344.24
2020/0384897 A1* 12/2020 Rogg ....................... B60N 2/08

FOREIGN PATENT DOCUMENTS

| | | |
|---|---|---|
| DE | 102015212459 | 1/2017 |
| DE | 102016123240 | 6/2018 |
| DE | 102019134374 | 6/2021 |

OTHER PUBLICATIONS

Official Action for Germany Patent Application No. 102023113094.3, dated Oct. 31, 2023, 39 pages.
Official Action for Germany Patent Application No. 102023113094.3, dated Apr. 1, 2025, 5 pages.
Extended European Search Report for Europe Patent Application No. 24161086, dated Jul. 29, 2024, 12 pages.

* cited by examiner

*Primary Examiner* — Joshua D Huson
*Assistant Examiner* — Vicente Rodriguez
(74) *Attorney, Agent, or Firm* — Sheridan Ross P.C.

(57) ABSTRACT

A vehicle seat with a seat part and with a seat base support-part arranged below the seat part, which is provided and designed to support the seat part, and with a seat base base-part, wherein the seat base support-part is displaceable relative to the seat base base-part along a displacement direction by means of a sliding device and wherein a rotational unit is provided, which is provided and designed so that the seat part is rotatable relative to the seat base support-part about an axis of rotation. When the seat base support-part is displaced, a displacement position of the seat base support-part is dependent on an angle of rotation of the rotational unit and, when the seat part is rotated, the angle of rotation of the rotational unit is dependent on the displacement position of the seat base support-part.

11 Claims, 12 Drawing Sheets

19

N0, D0
B
L
H
8, 9
6
7
19
12
13
8, 9

19
NO. D1
7
DW, DW1
19

B
H
11
4
14,15
10
3
8,9
37
13,36

VEHICLE SEAT

CROSS REFERENCE TO RELATED APPLICATION

This application claims the benefit of German Patent Application No. 10 2023 113 094.3, filed May 17, 2023, the entire contents of which are hereby incorporated herein by reference.

FIELD

The present patent application relates to a vehicle seat with a seat part and with a seat base support-part arranged below the seat part, which is provided and designed to support the seat part, and a seat base base-part, wherein the seat base support-part is displaceable relative to the seat base base-part along a displacement direction by means of a sliding device and wherein a rotational unit is provided, which is provided and designed so that the seat part is rotatable relative to the seat base support-part about an axis of rotation.

BACKGROUND

A vehicle seat of this type is known from the prior art, for example from DE 10 2012 112 523. Due to the fact that, according to the vehicle seat known from the prior art, the rotation and the longitudinal adjustment are designed independently of each other, a rotation can be carried out even in confined spaces, for example when the vehicle seat is pushed backwards and is limited in its rotational movement by armrests, fittings and the like, which is not actually intended, as parts of the vehicle seat are not prevented from hitting other fittings of the cabin or the like, which can lead to damage to the respective components.

SUMMARY

It is therefore the task of the present application to provide a vehicle seat which has a particularly simple design and overcomes the disadvantages of the prior art.

According to the invention, it is a core idea of the present application to provide a vehicle seat with a seat part and with a seat base support-part arranged below the seat part, which is provided and designed to support the seat part, and a seat base base-part, wherein the seat base support-part is displaceable relative to the seat base base-part along a displacement direction by means of a sliding device and wherein a rotational unit is provided, which is provided and designed so that the seat part is rotatable relative to the seat base support-part about an axis of rotation, the vehicle seat being characterised according to the invention in that, when the seat base support-part is displaced, a displacement position of the seat base support-part is dependent on an angle of rotation of the rotational unit and, when the seat part is rotated, the angle of rotation of the rotational unit is dependent on the displacement position of the seat base support-part.

It is conceivable that an angle of rotation can be regarded as a rotational angle position with regard to the rotational unit or the seat part. The angle of rotation describes an angle of rotation position of the seat part or the rotational unit, which can also be described as a rotational position.

Particularly preferably, the axis of rotation runs along a height direction, in particular a height direction of the vehicle seat.

Particularly preferably, the displacement direction is a longitudinal direction or a width direction of the vehicle seat, with the longitudinal direction being preferred. A displacement of the vehicle seat along the longitudinal direction to the rear or to the front and the dependence according to the invention on the angle of rotation of the rotational unit is a central point of the present invention. It may also preferably be provided that the rotational unit can be rotated both clockwise and anti-clockwise. Alternatively, it may also be provided that the rotational unit only allows clockwise or anti-clockwise movement. This depends on the area of application and the space requirements or the requirements of a driver.

According to the invention, it is provided that, when the seat base support-part is displaced, a displacement position of the seat base support-part is dependent on an angle of rotation of the rotational unit and, when the seat part is rotated, the angle of rotation of the rotational unit is dependent on the displacement position of the seat base support-part. This means that if a person wants to move the vehicle seat in the displacement direction, the possible displacement positions depend on the angle of rotation through which the seat part is rotated. The same applies analogously if the person wants to rotate the vehicle seat, the possible angle of rotation depends on the displacement position in which the seat part is currently located. For example, it is assumed that no or only limited rotational movements are possible with a seat that has been moved to the rear due to the limited space. The same also applies to a vehicle seat whose seat part has a considerable angle of rotation and cannot be moved into the area of limited space.

The displacement is a function dependent on the angle of rotation and the rotation is a function dependent on the displacement position.

A displacement position can be understood as a position of the seat part after a displacement backwards or forwards in an entire displacement range.

According to a preferred embodiment, it can accordingly be provided that when the seat base support-part is displaced, the angle of rotation is limited depending on the displacement position, and when the seat part is rotated, the angle of rotation is limited depending on the displacement position.

According to a particularly preferred embodiment, it is provided that a displacement along the displacement direction to the rear is limited by the angle of rotation. Preferably, this also applies to the angle of rotation, i.e. the angle of rotation is limited by the displacement position due to the rearward displacement of the seat part.

In particular, it is envisaged that the sliding device has a zero position. Preferably, the zero position can be understood in such a way that the seat part can be displaced forwards and backwards. Further preferably, a displacement forwards or backwards is possible from the zero position by a maximum displacement distance forwards and by a maximum displacement distance backwards.

In particular, it is provided that the rotational unit has a zero position. Preferably, the zero position can be understood to mean that the rotational unit has an angle of rotation of 0°, i.e. that the seat part is in its normal position, for example the seat part is directed forwards in the longitudinal direction. The longitudinal extension of the seat part is therefore parallel to the displacement direction. Furthermore, the angle of rotation can be described as the angle which is enclosed by the seat part or by the longitudinal extension of the seat part and by the displacement direction. It is also preferably possible to displace the seat forwards or backwards from the zero position by a maximum displacement distance forwards and by a maximum displacement distance backwards.

According to a preferred embodiment, it can be provided that a limitation of the angle of rotation and displacement is only provided for a displacement position that is shifted to the rear. This means that a forward displacement, for example starting from the zero position, and the rotation of the seat part are independent of each other. As the space available in front of the vehicle seat is more generous, this can be advantageous, namely in that it can be made easier to get into or sit on the vehicle seat by rotating it accordingly.

According to a further preferred embodiment, it may be provided that the sliding device has a first rail unit and a second rail unit, each with a first rail element and a second rail element, wherein the rail units are spaced apart from one another in a direction perpendicular to the displacement direction. Due to the spacing of the rail units from one another, the seat part of the vehicle seat can be displaced well in a plane formed by the rail units.

It is also preferable that the rail units or the rail elements are elongated so that the rail elements can be guided well relative to each other. The first rail element and the second rail element are designed to be displaceable relative to one another, which enables the seat base support-part to be displaced.

According to a further preferred embodiment, it may be provided that in each case the first rail element is connected to the seat base support-part and the second rail element is connected to the seat base base-part and the rail elements are designed relative to one another in such a way that the first rail element is displaceable relative to the second rail element. When the seat base support-part is displaced, the first rail element is displaced with it, whereas the second rail element is connected to the seat base-part, in particular is connected in a stationary manner, and accordingly does not undergo any displacement.

According to a further preferred embodiment, it may be provided that the rotational unit is connected to the seat base support-part. The rotational unit can therefore be an integral part of the seat base support-part or alternatively be designed in such a way that the rotational unit is detachably connected to the seat base support-part so that it can be replaced easily and inexpensively if the rotational unit is damaged. The rotational unit can be used to rotate the seat part around the axis of rotation.

According to a further preferred embodiment, it can be provided that the dependency between displacement and angle of rotation can be established by a first stop element and a second stop element. Particularly preferably, the first stop element is connected to the rotational unit and the second stop element is connected to the sliding device. Preferably, the stop elements can be designed in such a way that the stop elements can interact with each other. This means that in the event of displacement or rotation, the rotation during displacement or the displacement during rotation can be coupled and limited by interaction between the stop elements.

In order to be able to easily couple the displacement and the rotation, it can be provided according to a preferred embodiment that the first stop element is connected to the rotational unit and the second stop element is connected to the sliding device. In a particularly preferred embodiment, the second stop element is fixedly connected to the seat base base-part, which means that the second stop element does not undergo any displacement.

In order to arrange the second stop element in a space-saving manner, it can be provided according to a further preferred embodiment that the second stop element is arranged between the first rail unit and the second rail unit as viewed in the direction perpendicular to the displacement direction.

It is further preferable for the second stop element to be arranged below the seat base support-part and above the seat base base-part. This also saves space in terms of height direction.

According to a further preferred embodiment, in order to further save space, it may be provided that the first stop element is arranged below the rotational unit as viewed in the height direction. Further preferably, the first stop element is arranged below the seat base support-part, which enables free movement of the stop element due to the arrangement on the rotational unit.

It is particularly preferable for the first stop element to be detachably connected to the rotational unit so that it can be easily replaced if necessary. The detachable connection is preferably a screw connection, a rivet connection or similar.

According to a further preferred embodiment, it may be provided that the first stop element is connected to the rotational unit at a distance from the axis of rotation. This means that the first stop element is connected eccentrically to the rotational unit. This arrangement allows the first stop element to be moved along an arc of a circle when the rotational unit rotates, whereby a portion of the rotational movement can be performed in the displacement direction.

According to a further preferred embodiment, it may be provided that the first stop element and the second stop element are designed to overlap each other when viewed in the displacement direction. In particular, the stop elements are designed in such a way that at an angle of rotation of 0° and a rearward displacement, the stop elements contact and interact with each other, whereby a rear end stop for the displacement or the displacement device can be realised. In this case, rotation is completely prevented.

According to a further preferred embodiment, it may be provided that a first connecting element and a second connecting element are provided, wherein preferably the first connecting element is arranged below the first rail unit and the second connecting element is arranged below the second rail unit and the second stop element is connected to the first connecting element.

Particularly preferably, the first connecting element is connected directly to the first rail unit and the second connecting element is connected directly to the second rail unit.

Further preferably, the first connecting element and the second connecting element have the same extension in height direction. As the respective connecting element is arranged below the respective rail unit, this is necessary in order to avoid any inclination or unevenness of the seat part. It is also preferable that the connecting elements have an extension that essentially corresponds to the extension of the rail elements, preferably slightly smaller than the extension of the rail elements. This provides a good contact surface for the rail elements, which can prevent tilting or the like.

According to a further preferred embodiment, it may be provided that a centre line extending in the displacement direction is provided, wherein preferably the centre line is at a first distance from the first rail unit and the second rail unit. This means that the centre line is at the same distance from the first rail unit as it is from the second rail unit. It is particularly preferable for the first stop element and the second stop element to be arranged on the same side with respect to the centre line. In this way, the interaction between the stop elements can be carried out well and the required space in which the stop elements interact can be reduced to a minimum. The fact that the first stop element and the second stop element are arranged on the same side with respect to the centre line means that either a clockwise or anti-clockwise rotation is coupled with the longitudinal adjustment.

Preferably, it may be provided that the clockwise and/or anti-clockwise rotation is coupled to the displacement of the seat base support-part or is interdependent.

In order to preferably couple a clockwise and anti-clockwise rotation with the longitudinal adjustment or displacement, it may be provided that a third stop element and a fourth stop element are provided. Preferably, the third stop element and the fourth stop element are arranged on the other side of the centre line, so that the other direction of rotation can also be coupled with the displacement of the seat base support-part.

Particularly preferably, the possible configurations, features and embodiments with regard to the first stop element and the second stop element can be transferred in an analogous manner to the third stop element and the fourth stop element. Particularly preferably, the third stop element can be designed like the first stop element and the fourth stop element like the second stop element. It is preferable to note that the third and fourth stop elements are located on the other side of the centre line than the first and second stop elements.

Depending on the embodiment of the vehicle seat, it may therefore be that a first and a second stop element and/or a third and a fourth stop element are provided.

Particularly preferably, the third stop element can have at least one feature of the first stop element, and preferably all features. However, it is also possible that the first stop element has other features than the third stop element. The same applies analogously to the second and fourth stop elements.

Further embodiments and configurations in the embodiments are applicable to the other embodiments and can be freely combined with one another, provided that they do not correspond to opposing embodiments.

Further advantageous embodiments are shown in the subclaims.

Further objectives, advantages and usefulness of the present invention can be found in the following description in conjunction with the drawings.

The invention is described in more detail below in connection with the figures.

DETAILED DESCRIPTION

In the figures, identical components are to be understood with the corresponding reference signs. For the sake of clarity, components may not be labelled with a reference symbol in some figures, but have been designated elsewhere.

In the present figures, a coupling in one direction of rotation DR between a seat base base-part 4 and a seat base support-part 3 is shown purely as an example. Preferably, with regard to a further direction of rotation DR, the features from embodiments of the one direction of rotation can be adapted and designed or transferred in an analogous manner for the further direction of rotation.

Figure 1:
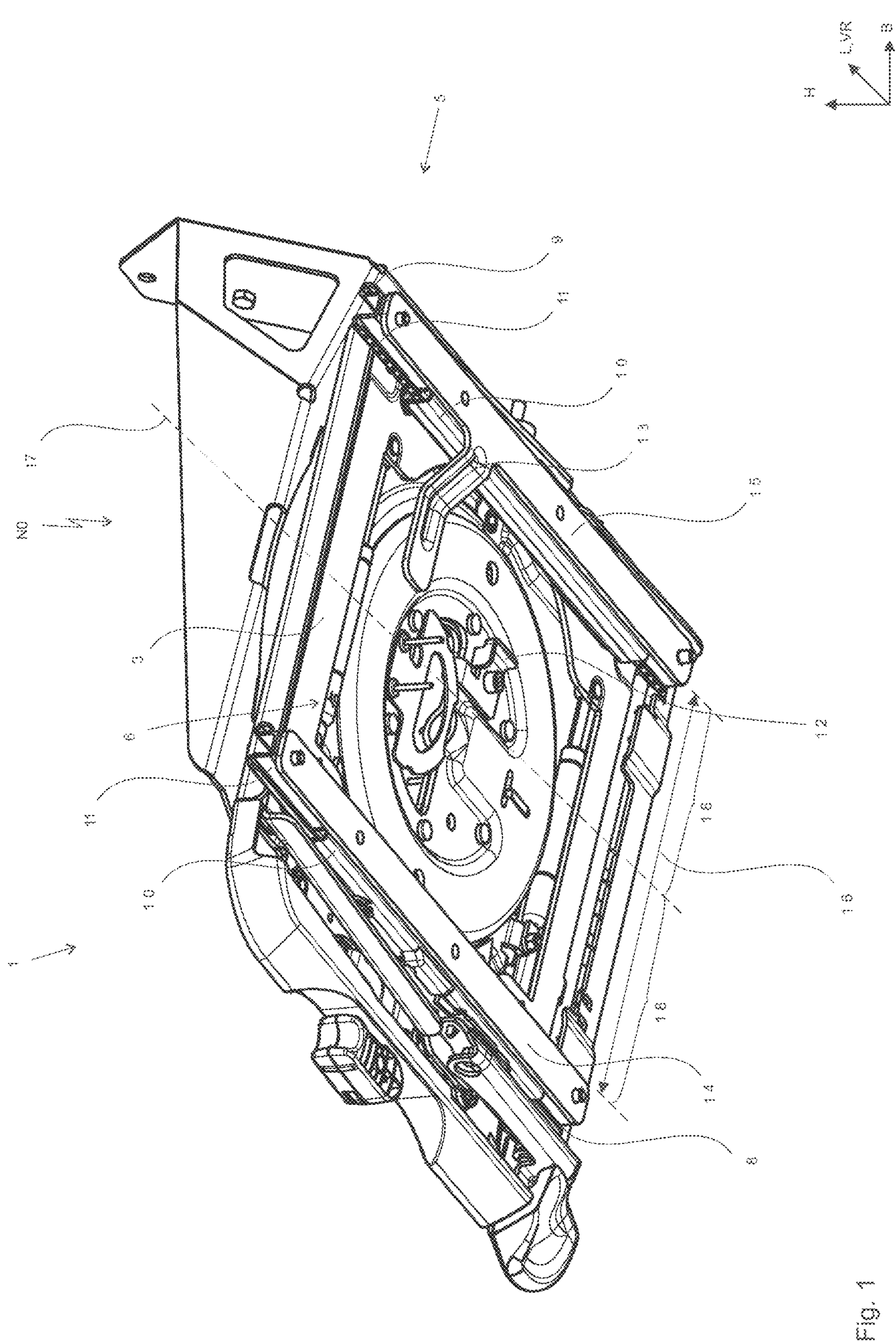
FIG. 1A perspective view of part of a vehicle seat.

FIG. 1 shows a vehicle seat 1 according to a preferred embodiment, wherein a seat part 2, which is arranged above a seat base support-part 3 as viewed in height direction H, is not shown. Similarly, a seat base base-part 4 is not shown, which is arranged below the part of the vehicle seat 1 shown, as viewed in height direction H. The seat base support-part 3 is intended and designed to support the seat part 2, the seat part 2 being connected to the seat base support-part 3.

In the present case, the vehicle seat 1 further comprises a rotational unit 6 and a sliding device 5. The sliding device 5 is designed and intended to displace the seat base support-part 3 relative to the seat base base-part 4, in particular to displace it linearly and particularly preferably only translationally. Preferably, the seat base support-part 3 can be displaced backwards and forwards along a longitudinal direction L, so that the longitudinal direction L corresponds to a displacement direction VR.

In the present case, the sliding device 5 is formed by a first rail unit 8 and a second rail unit 9. Preferably, the rail units 8, 9 are spaced apart in a width direction B by a first distance 16, which can be formed, for example, by a distance between two inner surfaces of the rail units 8, 9, which lie opposite each other.

It is further preferred that a zero position N0 is assigned to the sliding device 5. Preferably, the zero position N0 can be understood in such a way that the seat base support-part 3 can be displaced forwards and backwards. Further preferably, a forward or rearward displacement is possible from the zero position N0 by a maximum displacement distance forwards and by a maximum displacement distance backwards. It is particularly preferable for the displacement paths to be the same.

The respective rail unit 8, 9 comprises a first rail element 10 and a second rail element 11. Preferably, the first rail element 10 and the second rail element 11 are designed to be displaceable relative to one another. The first rail element 10 can be connected to the seat base support-part 3 and the second rail element 11 can be connected to the seat base base-part 4, in particular directly or indirectly. Indirectly means that further components can be arranged between the rail element 10, 11 and the seat base support-part 3 or the seat base base-part 4.

A rotational unit 6 is also shown, which is designed and intended to rotate the seat part 2 relative to the seat base support-part 3 about an axis of rotation 7 (not shown here). The axis of rotation 7 is preferably arranged in the height direction H and is particularly preferably parallel to the height direction H. The rotational unit 6 is designed and connected to the seat base support-part 3 in such a way that the seat part 2 can be rotated relative to the seat base support-part 3. Preferably, the seat part 2 can be rotated clockwise and anti-clockwise by means of the rotational unit 6.

The vehicle seat 1 is designed in such a way that when the seat base support-part 3 is displaced, a displacement position of the seat base support-part 3 is dependent on an angle of rotation of the rotational unit 6 and when the seat part 2 is rotated, the angle of rotation of the rotational unit 6 is dependent on the displacement position of the seat base support-part 3.

This means that if a person wants to move the vehicle seat 1 in the displacement direction VR, the possible displacement positions of the seat part 2 depend on the angle of rotation of the rotational unit 6 by which the seat part 2 is rotated. The same applies analogously if the person wishes to rotate the seat part 2, the possible angle of rotation depends on the displacement position of the seat base support-part 3 in which the seat part 2 is currently located.

For example, it is assumed that no or only limited rotational movements are possible, especially with a seat part 2 or seat base support-part 3 that has been moved to the rear, due to the limited space available. The same also applies to a vehicle seat 1 whose seat part 2 has a considerable angle of rotation, precisely because it cannot be moved into the area where there is little space.

In order to couple the displacement with the angle of rotation and the angle of rotation with the displacement, a first stop element 12 and a second stop element 13 are provided.

According to the embodiment shown in FIG. 1, the first stop element 12 is connected to the rotational unit 6 and the second stop element 13 is connected to the seat base base-part 4 in a fixed position relative to the seat base base-part 4.

This means that due to the displaceability of the seat base support-part 3 relative to the seat base base-part 4 and the connection between the first stop element 12 and the rotational unit 6, the first stop element 12 can also be displaced in the displacement direction VR with the seat base support-part 3 and about the axis of rotation 7. This in turn means that, since the second stop element 13 is fixedly connected to the seat base-part 4, the first stop element 12 is displaceable relative to the first stop element 13 with respect to a displacement forwards and backwards and with respect to a rotation about the first axis of rotation 7.

The stop elements 12, 13 are designed in such a way that interaction between the stop elements 12, 13 is possible, whereby the interaction can in particular be a mechanical interaction, i.e. the stop elements 12, 13 can contact each other. The interaction depends on the displacement position and the angle of rotation of the seat part 2.

The first stop element 12 and the second stop element 13 are preferably arranged on the same side with respect to a centre line 17. The centre line 17 preferably extends in the displacement direction VR. Further preferably, the centre line 17 has a second distance 18 from the first rail unit 8 and from the second rail unit 9, which means that the centre line 17 is at the same distance from the first rail unit 8 as it is from the second rail unit 9.

Further reference is made to the design of the first stop element 12 and the second stop element 13 in the other figures.

It is preferably provided that a first connecting element 14 is arranged below the first rail element 8 and a second connecting element 15 is arranged below the second rail element 9 in the height direction H, the second stop element 13 being connected to the first connecting element 14 or second connecting element 15, depending on the side on which the first stop element 12 is arranged with respect to the centre line 17.

Particularly preferably, the first connecting element 14 is connected directly to the first rail unit 8 and the second connecting element 15 is connected directly to the second rail unit 9. The connecting elements 14, 15 are thus arranged in the height direction H between the respective rail unit 8, 9 and the seat base base-part 4 and are each connected, in particular detachably connected, to these in order to be able to insert them subsequently and replace them if necessary. The same applies to the stop elements 12, 13.

The connecting elements 14, 15 and the stop elements 12, 13 are separate components that can be mounted on an existing vehicle seat. Correspondingly designed vehicle seats as described in the generic term can therefore be retrofitted with the elements.

Further preferably, the first connecting element 14 and the second connecting element 15 have the same extension in height direction H. Because the respective connecting element 14, 15 is arranged below the respective rail unit 8, 9, this is necessary in order to avoid any skewing or unevenness of the seat part. Further preferably, the connecting elements 14, 15 have an extension in width direction B and longitudinal direction L which essentially corresponds to the extension in width direction B and longitudinal direction L of the rail elements 8, 9, preferably is slightly smaller than the extension in width direction B and longitudinal direction L of the rail elements 8, 9.

Further preferably, the stop elements 12, 13 are arranged between the rail units 8, 9 when viewed in the width direction.

Figures 2A, 2B:
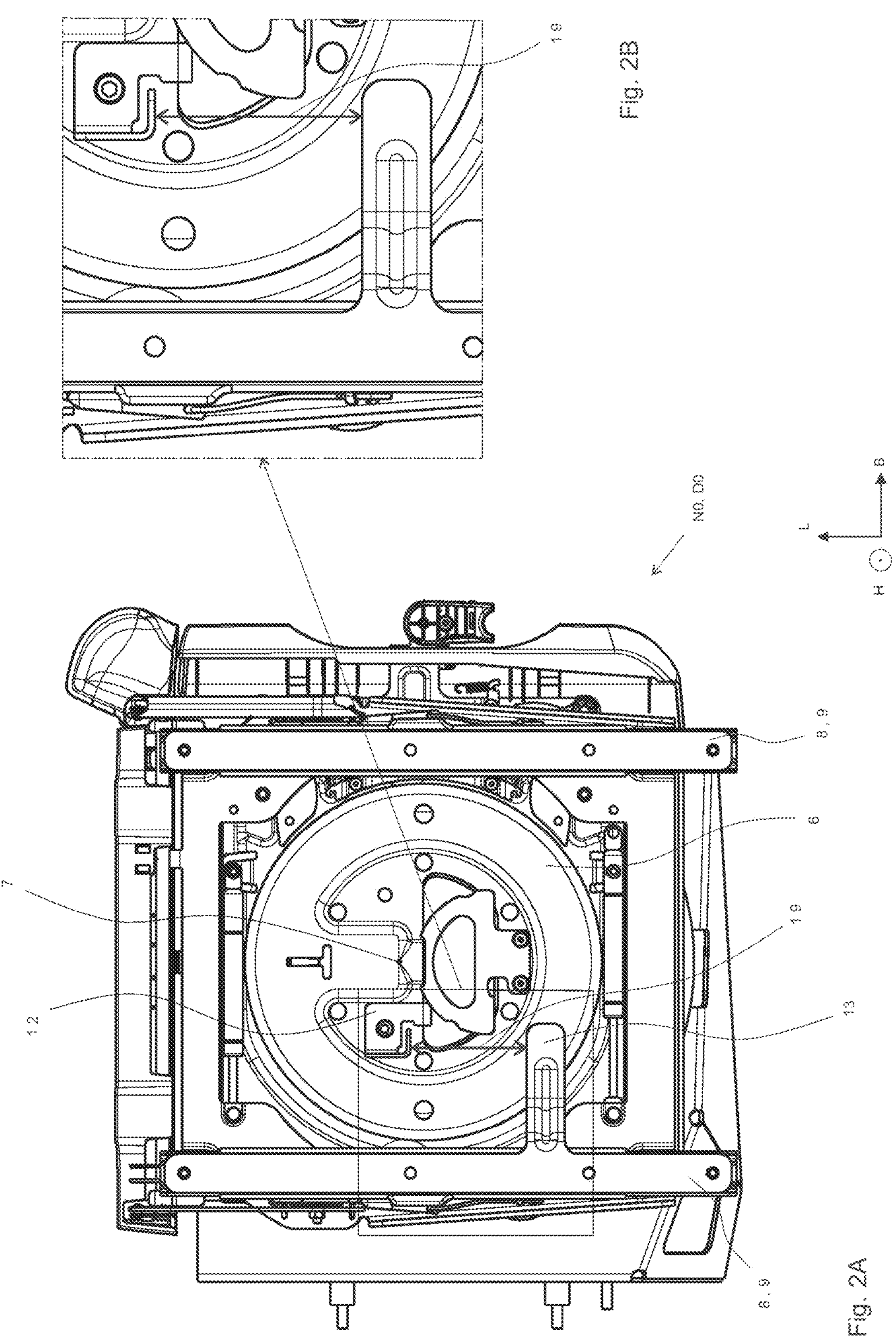
FIG. 2A the part of the vehicle seat shown in FIG. 1 in an bottom view.
FIG. 2B an enlargement of a part of FIG. 2A.

In FIG. 2A, the vehicle seat 1 as shown in FIG. 1 is shown in a view from below. FIG. 2B corresponds to a part of FIG. 2A.

The stop elements 12, 13 have a variable distance 19 from each other, whereby the variable distance 19 depends on the displacement position and the angle of rotation.

It can also be seen that the angle of rotation of the rotational unit 6 is 0° in the present case. This corresponds to a zero position DO of the rotational unit 6 and the vehicle seat 1 is in the zero position N0.

In this case, the variable distance 19 corresponds to the maximum displacement path to the rear, i.e. when the stop elements 12, 13 contact and interact due to a rearward displacement of the seat base support-part 3 relative to the seat base base-part 4, this describes an end stop.

Similarly, a maximum angle of rotation can be achieved by which the rotational unit 6 or the seat part 2 can be rotated, since a possible arc length of a circular arc on which the first stop element 12 moves is maximum. The arc length refers to the length of the arc between the rotational position described by the angle of rotation 0° and the actual angle of rotation of the seat part 2 or the rotational unit 6.

The length of the variable distance 19 and the arc length are interdependent. The arc length is determined by the length of the variable distance 19 and the length of the variable distance 19 is determined by the arc length and are interdependent.

Figures 3A, 3B:
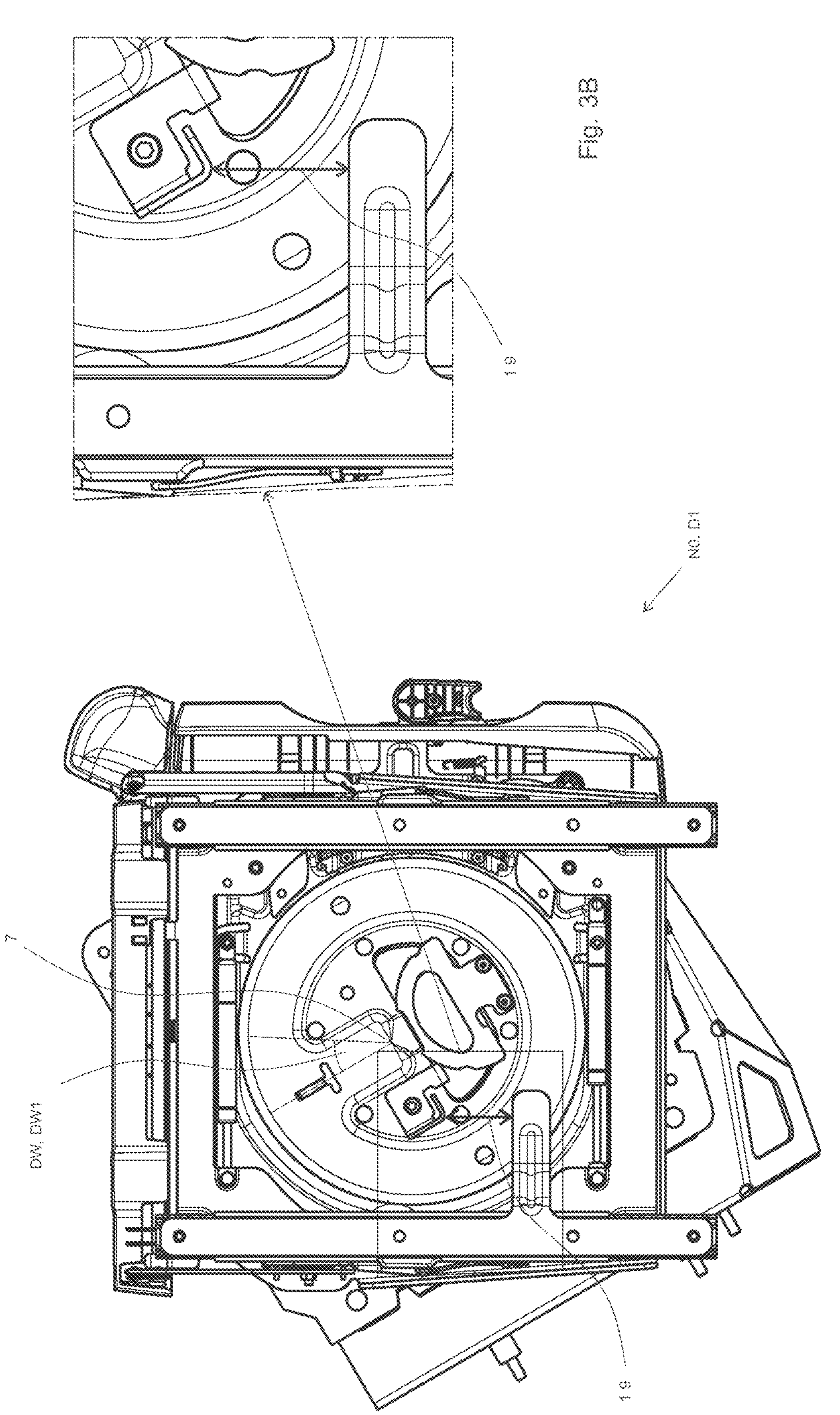
FIG. 3A the part of the vehicle seat shown in FIG. 1 in a bottom view in a rotational position.
FIG. 3B an enlargement of a part of FIG. 3A.

In FIGS. 3A and 3B, the vehicle seat 1 is shown in a further position, in this case in a first rotational position D1 with a first angle of rotation DW1. As can be seen, the variable distance 19 is reduced and is now smaller than the distance 19 in position N0, D0. This means that a displacement of the seat base support-part 3 and correspondingly of the seat part 2 to the rear is only possible by a displacement path that is smaller than the maximum possible displacement path that is present in position N0, D0.

FIG. 3B shows a part of FIG. 3A in an enlarged view.

FIG. 4 schematically shows again the previously described with different angles of rotation or rotational positions D0, D1, D2, D3, D4 formed by angles of rotation DW0, DW1, DW2, DW3, DW4 of the rotational unit 6 and the associated possible displacement paths VW0, VW1, VW2, VW3, VW4 of the sliding device 5. The outlines of the stop elements 12, 13 are shown.

Figure 5A:
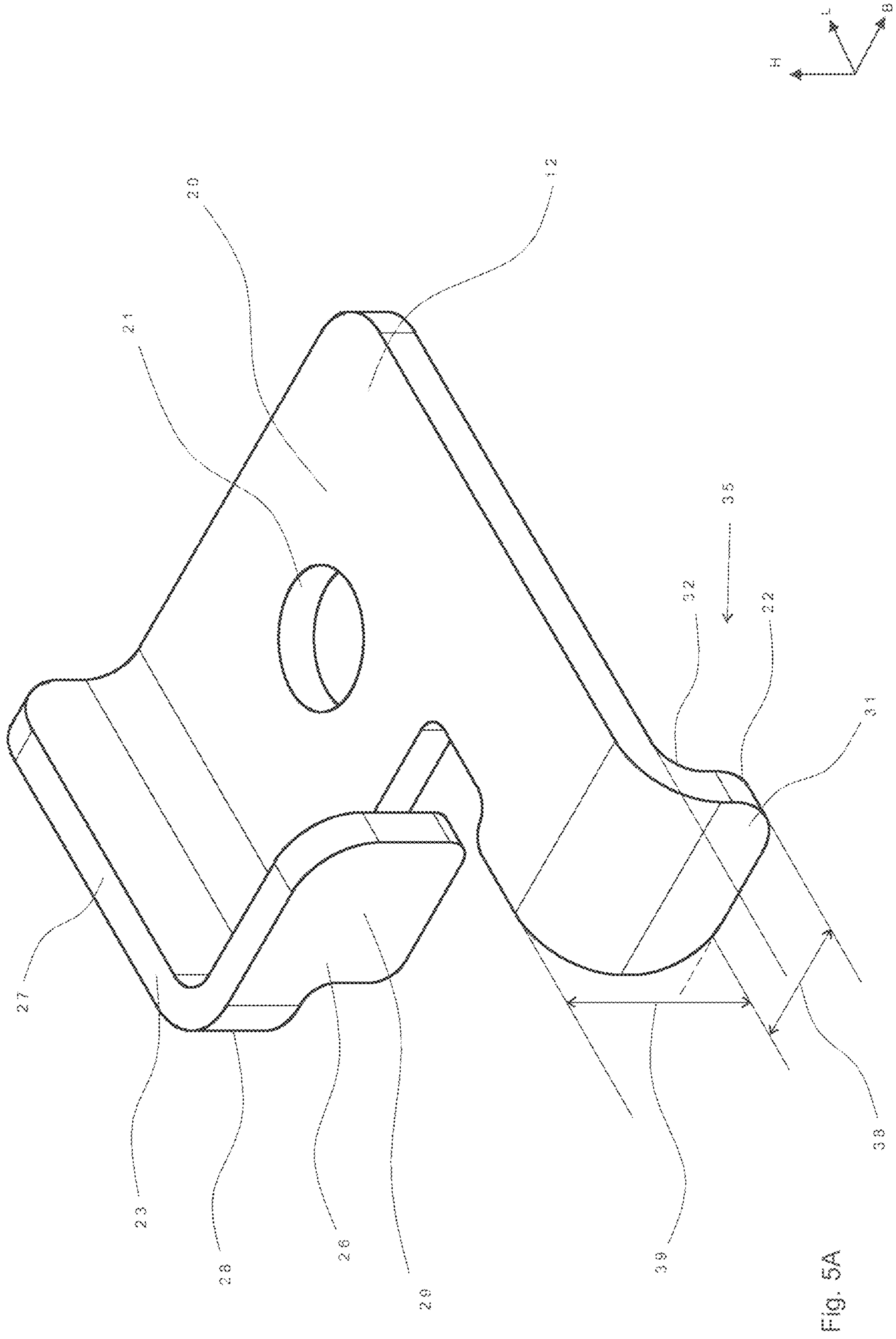
FIG. 5A an embodiment of the first stop element.
Figure 5B:
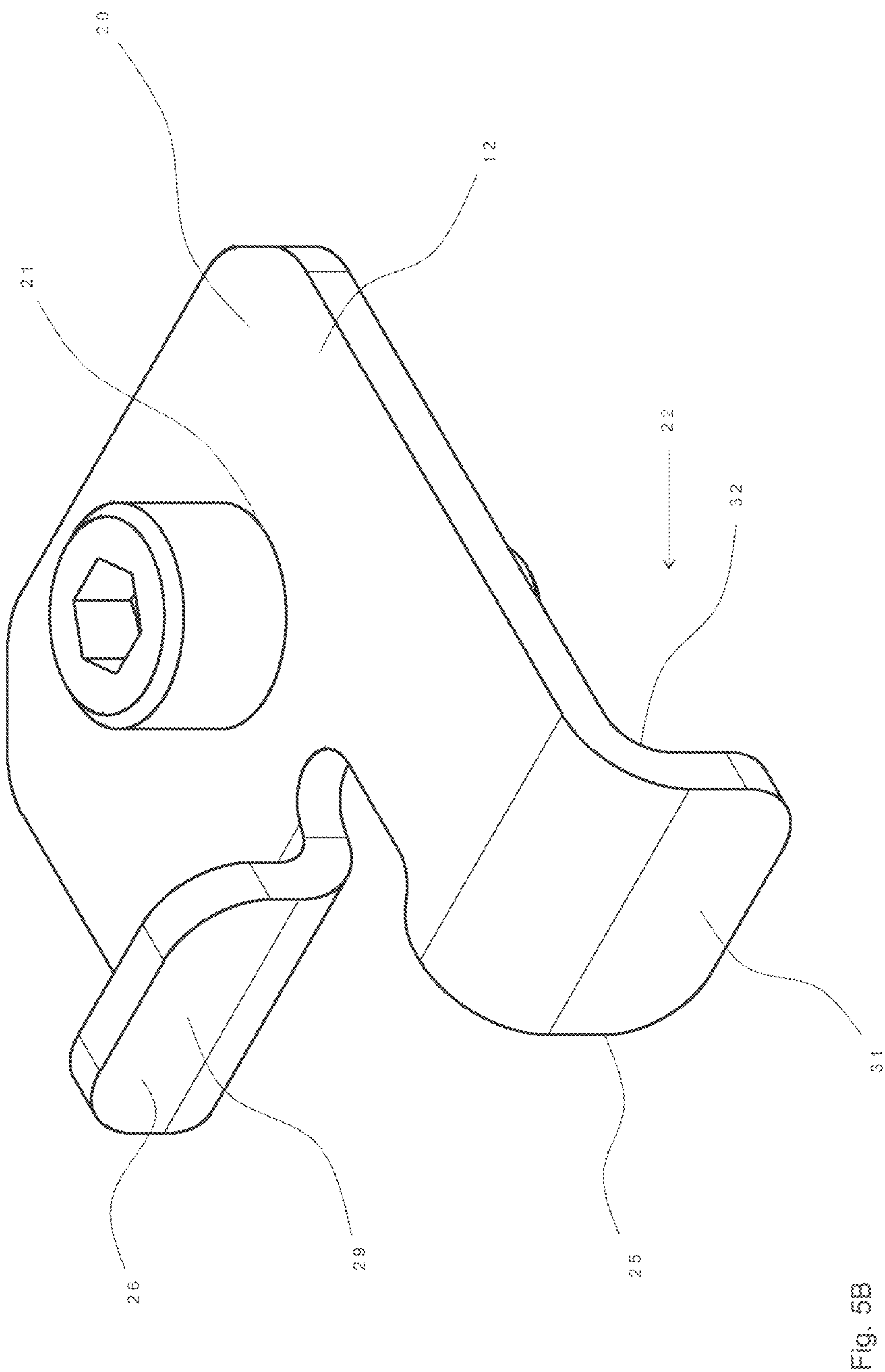
FIG. 5B an embodiment of the first stop element.

The first stop element 12 can have various embodiments, which are shown in FIGS. 5A and 5B. Of course, other embodiments are also conceivable, so that the embodiments according to FIGS. 5A, 5B are to be understood merely as examples.

The first stop element 12 shown in FIG. 5A comprises a base plate 20, wherein the base plate 20 is preferably of a flat design. Furthermore, a passage opening 21 is provided, which is designed and provided so that a further element can extend through the base plate 20 by means of the passage opening 21. The further element can, for example, be a screw element, a rivet element or the like, so that the first stop element 12 can be connected to the rotational unit 6.

Preferably, only one passage opening 21 is provided, so that the number of fastening elements for fastening the first fastening element to the rotational unit is reduced and easy assembly is possible.

In order to further facilitate assembly, a first section 22 is provided, which is preferably provided and designed to engage in a recess 24 of the rotational unit 6. The recess 24 is intended and designed to receive the first section 22. The first section 22 and the associated recess 24 can provide an additional coupling or connection between the first stop element 12 and the rotational unit 6, the configuration of which enables the first stop element 12 to be correctly mounted.

In addition, the first section 22 can provide an anti-rotation lock for the first stop element 12, since the provision of a single connecting element for fastening the first stop element 12 to the rotational unit 6 can result in undesired rotational movements of the first stop element 12 relative to the rotational unit 6 despite a fixed connection, for example due to contact between the stop elements 12, 13.

For this purpose, the first section 22 can comprise a first section area 25 which extends upwards or downwards in a direction perpendicular to the base plate 20 with a height extension 38. In order to be able to act as an anti-rotation device, it is preferably provided that the first section area 25 has a width extension 38, so that a kind of pin is formed which can contact the recess 24, whereby a mechanical contact is provided in addition to the connecting element with the rotational unit 6. This is shown, for example, in FIG. 5C.

Further preferably, the first stop element 12 comprises a second section 23, which is intended and designed to interact with the second stop element 13.

According to the embodiment shown in FIG. 5A, the second section 23 comprises a first section area 26 and a second section area 27, wherein preferably the first section area 26 extends in the width direction B and the second section area 27 extends in the longitudinal direction L. Further preferably, the part areas 26, 27 extend upwards and downwards respectively in the height direction H, but in the opposite direction, starting from the base plate 20, as the first section area 25 of the first section 22. This means that when the first section area 25 of the first section 22 extends downwards, the first section area 26 and the second section area 27 of the second section 23 extend upwards, and vice versa.

Further preferably, the first section area 25 and the second section area 26 of the second section 23 can be connected to each other by means of a connecting part 28, preferably connected by a material bond. Because the connecting parts 26, 27 are connected to each other by the connecting part 28 and extend perpendicular to each other, the second section 23 can be designed to be particularly stable, so that damage caused by contact with the second section element 13 can be easily prevented.

Particularly preferably, the connecting part 29 is curved, so that forces acting on the second section 23 can be well distributed or dissipated.

A contact surface 29 can be formed by the first section area 26 of the second section 23, which can interact with the second stop element 13.

According to the embodiment of the first stop element 12 as shown in FIG. 5B, this is similar to the embodiment of FIG. 5A, whereby the second section area 27 has been omitted here. The explanations of the other elements are analogous to the embodiment shown in FIG. 5A.

Furthermore, the first section area 25 of the first section 22 has an outer side 31 and an inner side 32. The arrangement of the first stop element 12 is particularly preferred in such a way that the inner side 32 is in contact with the recess 24 of the rotational unit 6, in particular in active contact by means of a frictional connection.

Figure 5C:
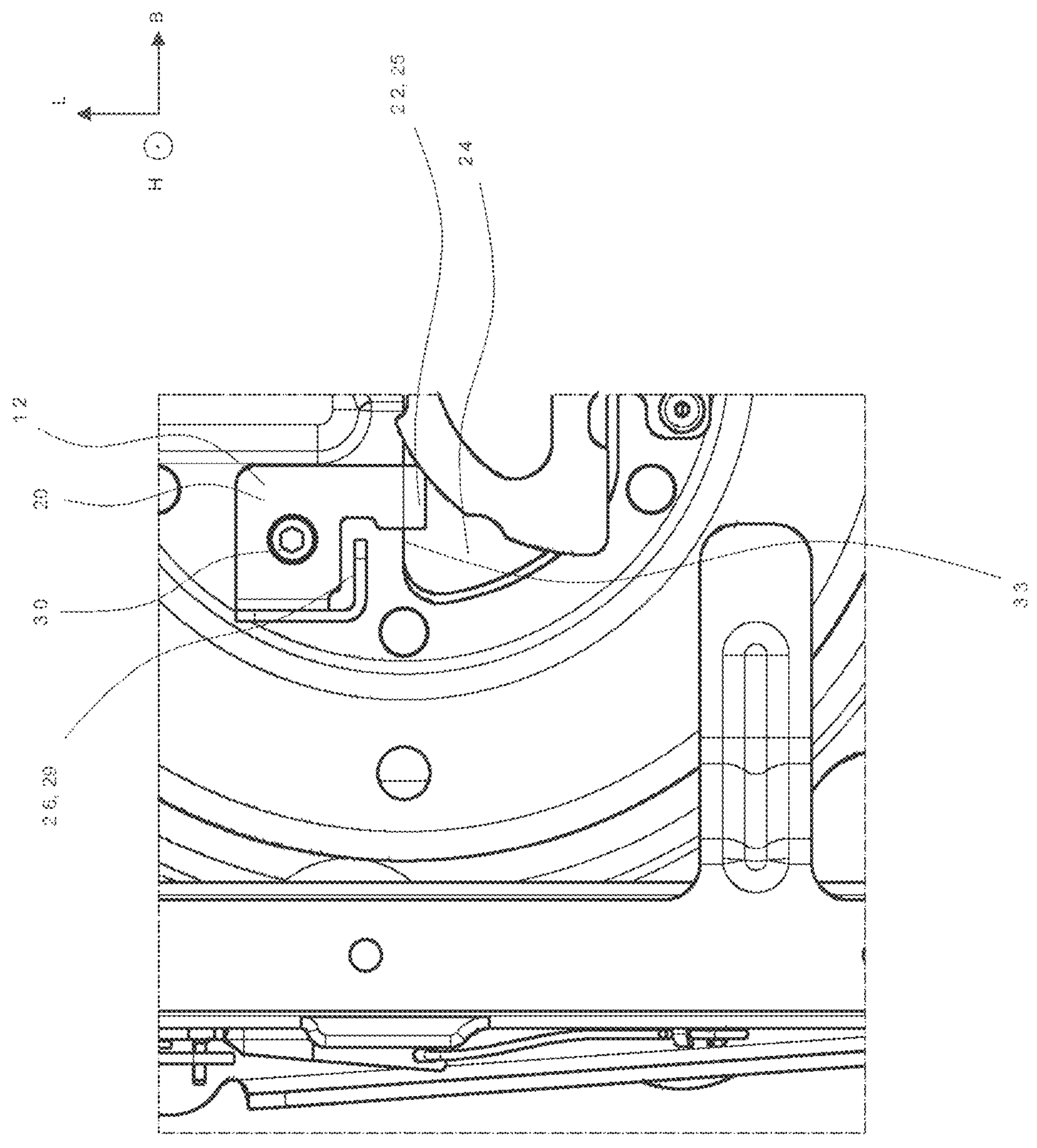
FIG. 5C arrangement of the first stop element according to FIG. 5A with the rotational unit.
Figure 5D:
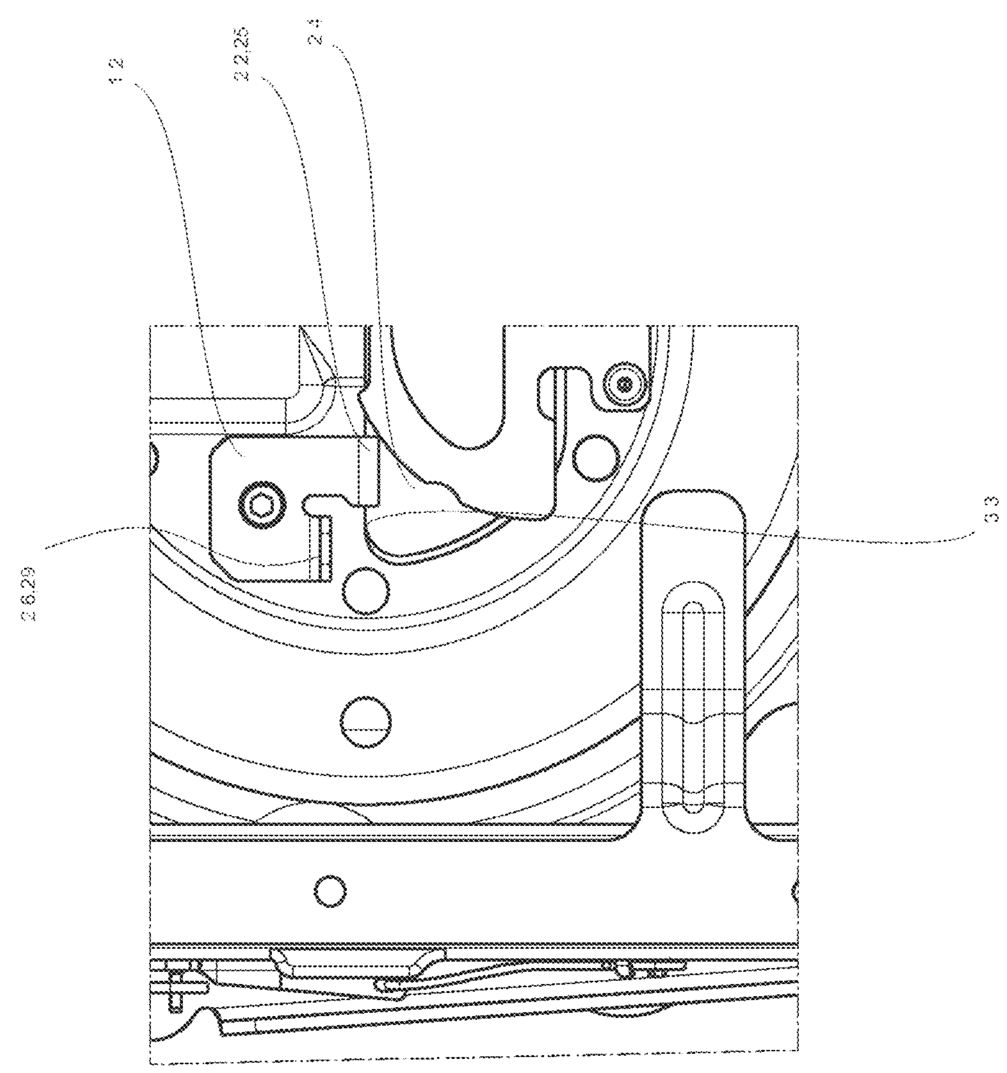
FIG. 5D arrangement of the first stop element according to FIG. 5B with the rotational unit.

The connection of the first stop element 12 to the rotational unit 6 is shown in more detail in FIGS. 5C and 5D.

Particularly preferably, the first stop element 12 is in contact with the rotational unit 6 on the one hand by means of the connecting element 30 and on the other hand by contacting the inner side 32 of the first section area 25 with an inner side 33 of the recess 24, whereby a non-rotating connection between the first stop element 12 and the rotational unit 6 is possible. The assembly of the first stop element 12 is also facilitated, since the positioning of the first stop element 12 is at least partially or completely predetermined by the first section area 25. Markings or even small latching projections can be provided for positioning the first section area 25.

Figure 6:
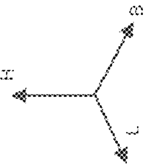
FIG. 6 embodiment of the second stop element.
Figure 6:
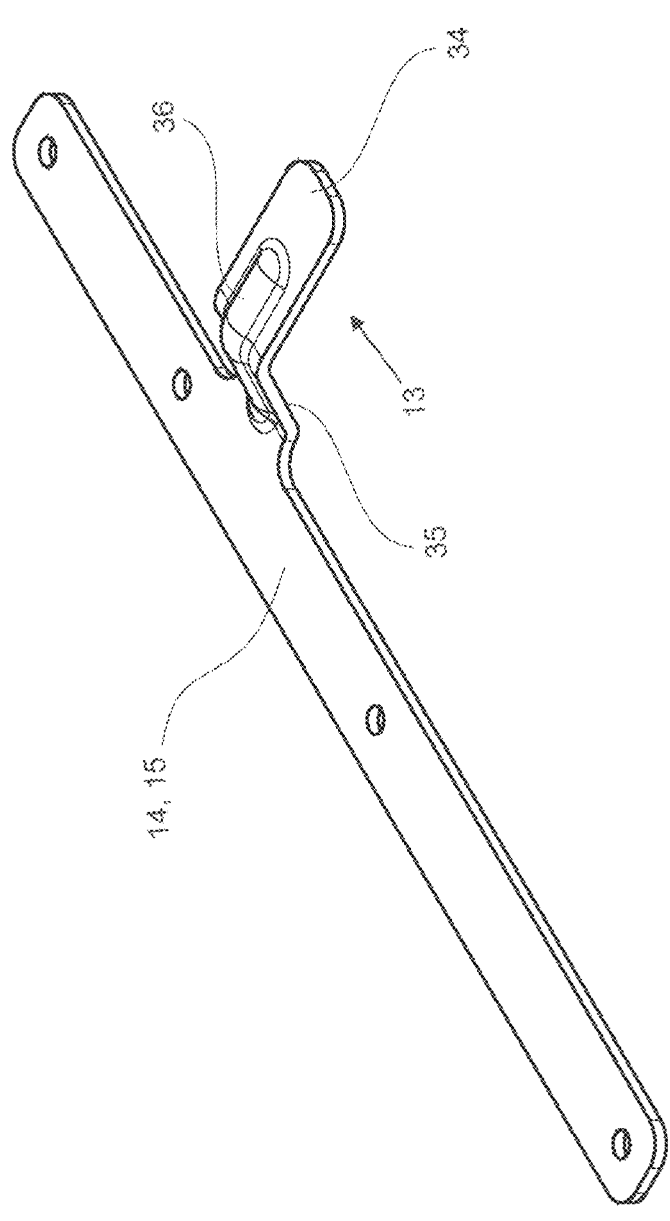

FIG. 6 shows a possible design of the second stop element 13. Of course, other embodiments are also conceivable, so that FIG. 6 merely shows an example of an embodiment of the second stop element 13.

The second stop element 13 comprises a first stop area 34, which is intended to interact with the first stop element 12. Preferably, the first stop area 34 has a planar design, with the main extents lying in the longitudinal direction L and the width direction B and being greater than the extent in the height direction H. This means that the first stop area 34 is formed essentially perpendicular to the contact surface 29, whereby tilting of the stop elements 12, 13 is achieved and also height deviations of the first section area 25 are not significant. Viewed in longitudinal direction L, the first stop element 12 and the second stop element 13 overlap.

Particularly preferably, the second stop element 13 is connected to the first connecting element 14 or the second connecting element 15, depending on the arrangement of the first stop element 12. For this purpose, a transition area 35 is provided, which connects the second stop element 13 to the connecting element 14, 15. In particular, the second stop element 13 and the connecting element 14, 15 are connected to the transition area 35 by a material bond. In particular, the transition area extends obliquely, i.e. at an angle to a plane formed by the longitudinal direction L and the width direction B, upwards in the height direction H. The second stop element 13 is accordingly arranged above the connecting element 14, 15 in the height direction H.

Further preferably, a reinforcement 36 may be provided, such as a reinforcement 36 of the material. Preferably, the reinforcement 36 is connected to the transition area 35 and the first stop area 34 and, in particular, is integral or materially bonded thereto. Due to the reinforcement 36, forces occurring due to the interaction of the stop elements 12, 13 can be well absorbed and damage, for example due to deformation, can be prevented.

Figure 7:
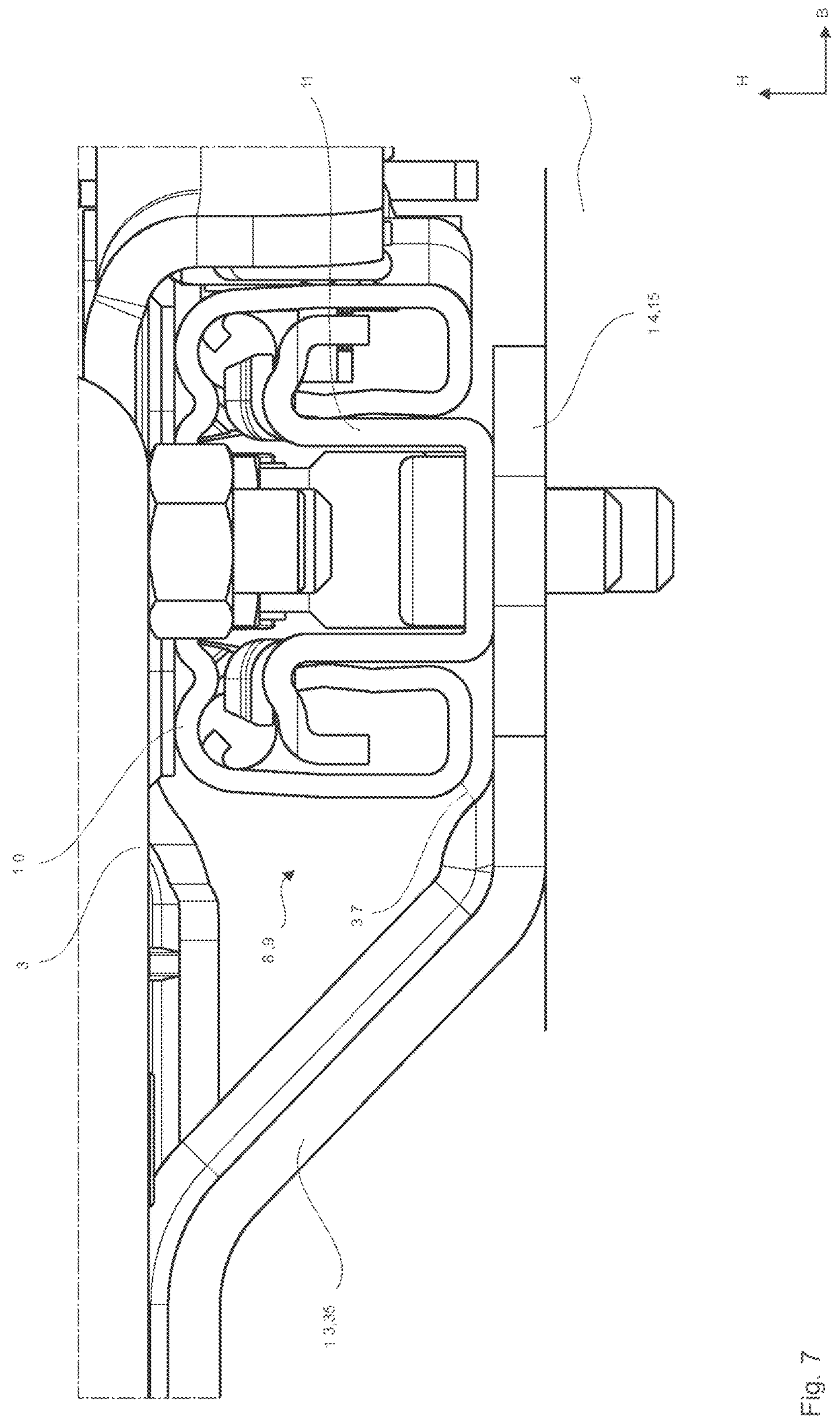
FIG. 7 part of FIG. 1 in a front view.

FIG. 7 shows a part of a front view, which illustrates the arrangement of the rail units 8, 9, the connecting element 14, 15 and the second stop element 13 in more detail.

The connecting element 14, 15 is arranged between the rail unit 8, 9 and the seat base base-part 4, the rail unit 8, 9 having a spacing 37 from the transition area 35 or the second stop element 13.

Figure 4:
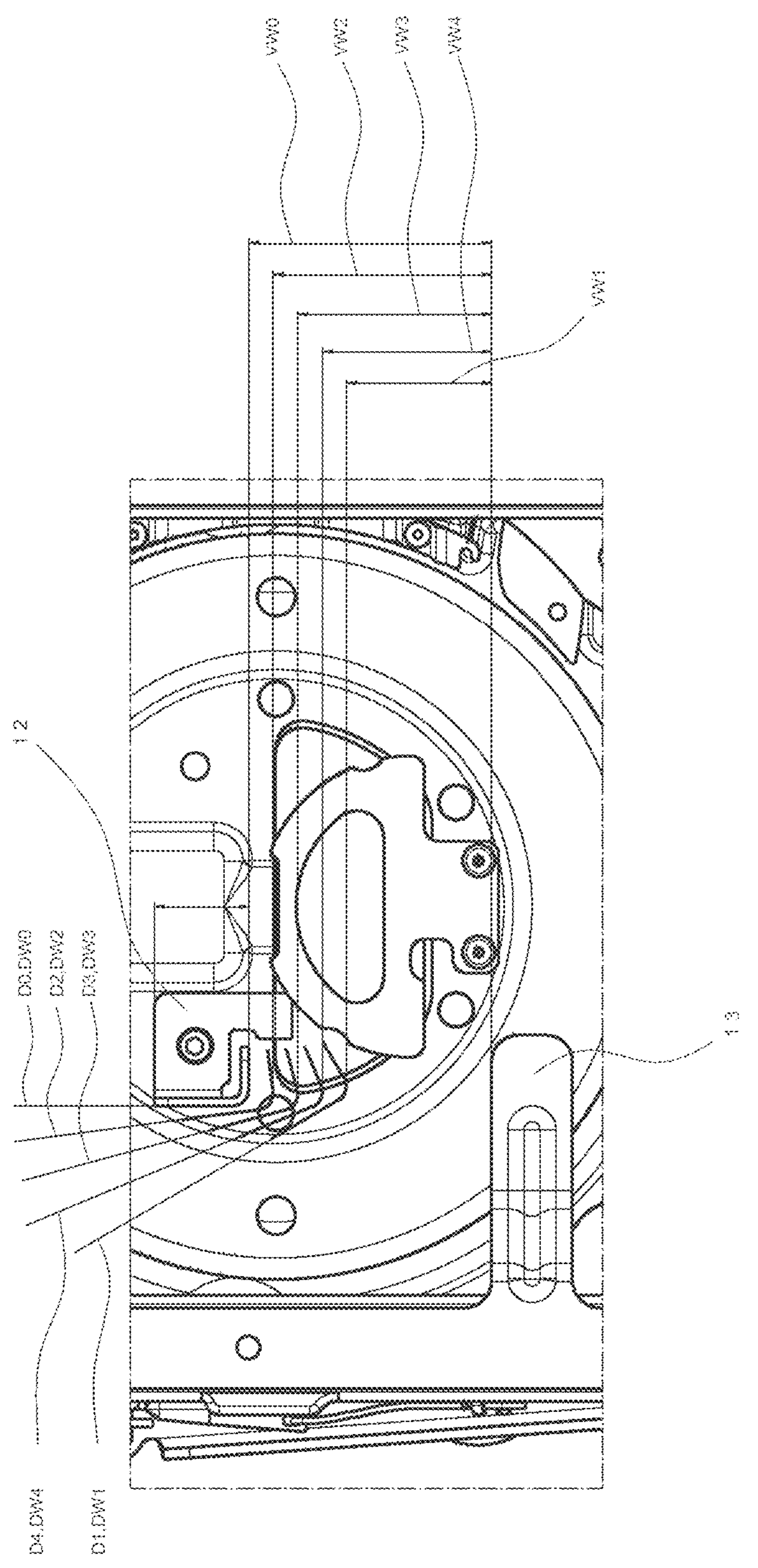
FIG. 4 an overview of the functional principle.
Figure 8:
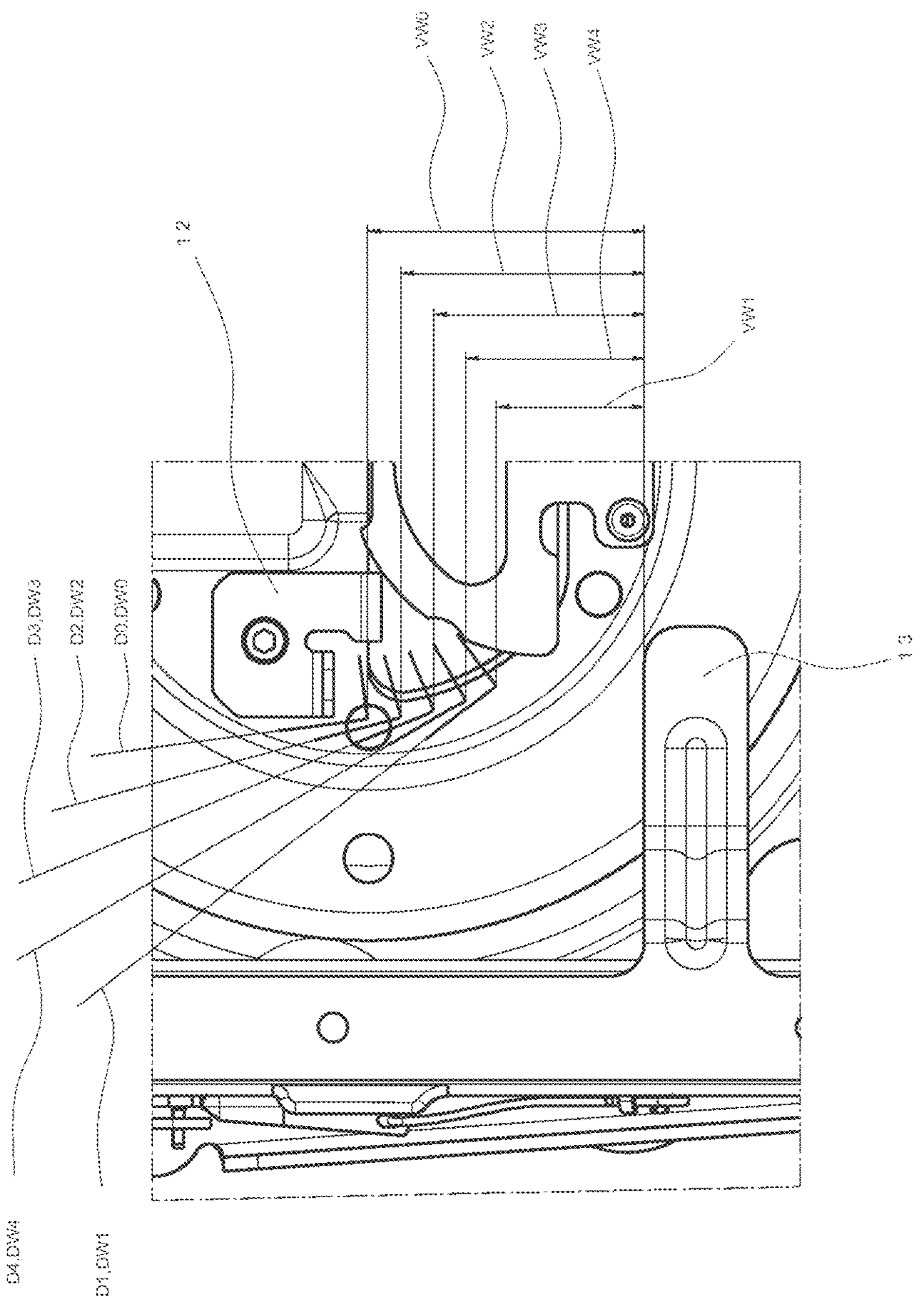
FIG. 8 provides a further overview of the operating principle.

FIG. 8 is equivalent to FIG. 4, wherein the first stop element 12 is shown according to the embodiment of FIG. 5B.

Figure 9:
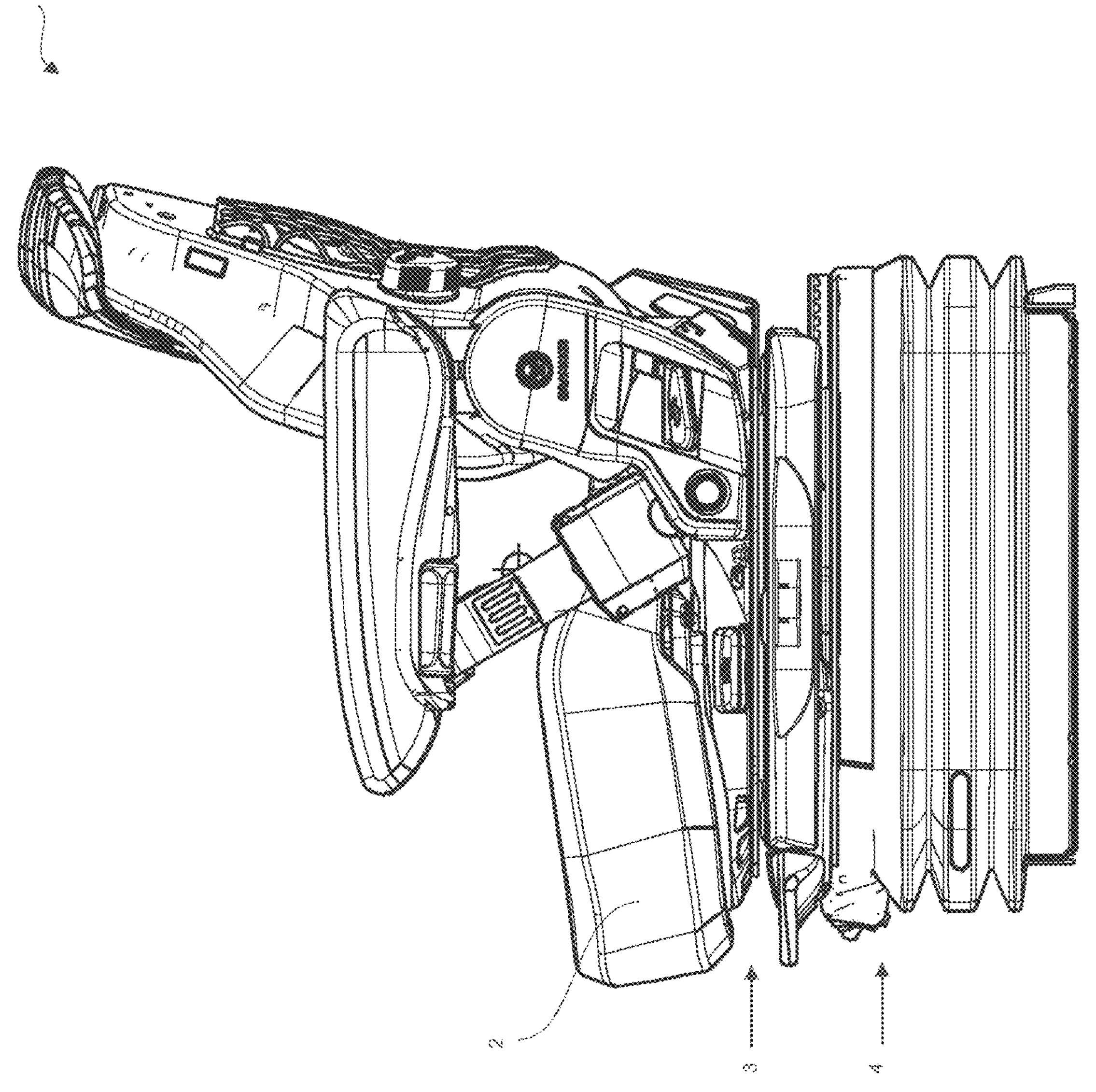
FIG. 9 a side view of a vehicle seat.

FIG. 9 shows a side view of the vehicle seat 1 with the seat part 2, the seat base support-part 3 and the seat base base-part 4.

All the features listed can be combined with each other in any way.

All features disclosed in the application documents are claimed to be essential to the invention, provided that they are new, either individually or in combination, compared to the prior art.

LIST OF REFERENCE SYMBOLS

1 Vehicle seat
2 Seat section
3 Seat base support-section
4 Seat base base-section
5 Sliding device
6 Rotational unit
7 Axis of rotation
8 First rail unit
9 Second rail unit
10 First rail element
11 Second rail element
12 First stop element
13 Second stop element
14 First connecting element
15 Second connecting element
16 First distance
17 Centre line
18 Second distance
19 Variable distance
20 Base plate
21 Passage opening
22 First section
23 Second section
24 Recess
25 First section area
26 First section area
27 Second section area
28 Connecting part
29 Contact surface
30 Fastening element
31 Outer side
32 Inner side
33 Inside of the recess
34 First stop area
35 Transition area
36 Reinforcement
37 Spacing
38 Width extension
39 Height extension
DW Angle of rotation
VP Displacement position
VR Displacement direction
R Direction
L Longitudinal direction
B Width direction
H Height direction

What is claimed is:

1. A vehicle seat, comprising:
a seat part;
a seat base support-part arranged below the seat part, which is provided to support the seat part; and
a seat base base-part, wherein the seat base support-part is displaceable relative to the seat base base-part by means of a sliding device along a displacement direction, the sliding device comprises two rail units, wherein the rail units are spaced apart from one another in a direction perpendicular to the displacement direction, a rotational unit is provided for the seat part to be rotatable relative to the seat base support-part about an axis of rotation, wherein the rotational unit is connected to the seat base support-part, and
wherein
when the seat base support-part is displaced along the displacement direction, which is parallel to a longitudinal extension of the seat part, a displacement position of the seat base support-part is dependent on an angle of rotation of the rotational unit and when the seat part is rotated, the angle of rotation of the rotational unit is dependent on the displacement position of the seat base support-part,
wherein a first stop element is directly and removably connected eccentrically to the rotational unit,
wherein two connecting elements are provided, each being arranged between a rail unit and the seat base base-part,
wherein a second stop element extends from one of the connecting elements and is fixedly connected to the seat base base-part,
wherein the stop elements are configured to interact with one another, and
wherein the first stop element and the second stop element are arranged on the same side with respect to a center line of at least the seat base support-part, and
wherein the center line extends in the displacement direction between the two rail units.

2. The vehicle seat according to claim 1, wherein when the seat base support-part is displaced, the angle of rotation is limited as a function of the displacement position, and wherein when the seat part is rotated, the angle of rotation is limited as a function of the displacement position.

3. The vehicle seat according to claim 1, wherein the sliding device has a first rail unit and a second rail unit each with a first rail element and a second rail element.

4. The vehicle seat according to claim 3, wherein the first rail element is connected to the seat base support-part and the second rail element is connected to the seat base base-part, and wherein the first and second rail elements are configured in relation to one another such that the first rail element can be displaced relative to the second rail element.

5. The vehicle seat according to claim 3, wherein the second stop element is arranged between the first rail unit and the second rail unit as viewed in the direction perpendicular to the displacement direction.

6. The vehicle seat according to claim 3, wherein the first stop element and the second stop element are configured to overlap one another when viewed in the displacement direction.

7. The vehicle seat according to claim 3, further comprising:

a first connecting element; and a second connecting element, wherein the first connecting element is arranged below the first rail unit and the second connecting element is arranged below the second rail unit.

8. The vehicle seat according to claim 3, wherein the first stop element, viewed along the displacement direction, is arranged in front of the second stop element.

9. The vehicle seat according to claim 1, wherein a transition area is provided, which connects the second stop element to at least one of the connecting elements, wherein the transition area extends at an angle to a plane formed by a longitudinal direction and a width direction, upwards in a height direction, and wherein the second stop element is accordingly arranged above at least one of the connecting elements in the height direction.

10. The vehicle seat according to claim 1, wherein the first stop element is detachably connected to the rotational unit.

11. The vehicle seat according to claim 1, wherein each of the two connecting elements is detachably connected the respective rail unit and the seat base base-part.

* * * * *